US012653149B2

(12) United States Patent
Guo et al.

(10) Patent No.: US 12,653,149 B2
(45) Date of Patent: Jun. 16, 2026

(54) WATER DISPENSER FOR PETS

(71) Applicant: SHENZHEN CHEERBLE TECHNOLOGY CO., LTD., Shenzhen (CN)

(72) Inventors: Wei-Cheng Guo, Shenzhen (CN); Jin-Bin Xie, Shenzhen (CN)

(73) Assignee: SHENZHEN CHEERBLE TECHNOLOGY CO., LTD., Shenzhen (CN)

( * ) Notice: Subject to any disclaimer, the term of this patent is extended or adjusted under 35 U.S.C. 154(b) by 214 days.

(21) Appl. No.: 18/534,378

(22) Filed: Dec. 8, 2023

(65) Prior Publication Data

US 2024/0389551 A1 Nov. 28, 2024

(30) Foreign Application Priority Data

May 27, 2023 (CN) .......................... 202321319934.2

(51) Int. Cl.
*A01K 7/02* (2006.01)
*H02K 16/00* (2006.01)
(52) U.S. Cl.
CPC ........... *A01K 7/025* (2013.01); *H02K 16/005* (2013.01)

(58) Field of Classification Search
CPC ...................................................... A01K 7/025
See application file for complete search history.

(56) References Cited

U.S. PATENT DOCUMENTS

| 2012/0017840 A1* | 1/2012 | Allis | .................... H02K 49/108 |
| | | | 310/104 |
| 2020/0084999 A1* | 3/2020 | Yoo | ......................... C02F 1/003 |

OTHER PUBLICATIONS

Translation of CN_216821236_U (Year: 2022).*
Translation of CN_114667942_A (Year: 2022).*

* cited by examiner

*Primary Examiner* — Timothy D Collins
*Assistant Examiner* — Brittany A Lowery
(74) *Attorney, Agent, or Firm* — ScienBiziP, P.C.

(57) ABSTRACT

A water dispenser for pets includes a water tank for receiving a liquid, a drainage assembly arranged in the water tank, a fan blade rotatably received in the drainage assembly for driving the liquid in the water tank to flow out through the drainage assembly, and a driving assembly arranged outside the water tank and configured for driving the fan blade to rotate through magnetic force.

19 Claims, 10 Drawing Sheets

WATER DISPENSER FOR PETS

FIELD

The subject matter herein generally relates to pet supplies, more particularly, to a water dispenser for pets.

BACKGROUND

As the improvement of living standards improves, it is common for people to keep pets such as cats and dogs at home. Therefore, water dispenser for pets are becoming popular, and consumers are paying more attention to the experience of using the water dispensers, such as the safety of the water dispensers, the noise of the water dispensers, and so on.

Therefore, there is room for improvement within the art.

SUMMARY

The present disclosure provides a water dispenser for pets with good user experience.

An embodiment of a water dispenser for pets according to the present disclosure, includes a water tank for receiving a liquid, a drainage assembly arranged in the water tank, a fan blade rotatably received in the drainage assembly for driving the liquid in the water tank to flow out through the drainage assembly, and a driving assembly arranged outside the water tank and configured for driving the fan blade to rotate through magnetic force.

Compared with arranging the water pump directly in the water received in the water tank, in the above water dispenser, the driving assembly is arranged outside the water tank and not directly placed in the water, that is, the driving assembly is completely separated from the water, and at the same time, the fan blade is driven to rotate through magnetic force between the driving assembly and the fan blade to achieve water pumping function, so that the water dispenser can realize a separation of water and electricity, thereby preventing pets from getting electric shock when using the water dispenser to drink water. The safety of the water dispenser can be improved, so that the user experience can be improved.

BRIEF DESCRIPTION OF THE DRAWINGS

Implementations of the present disclosure will now be described, by way of embodiments, with reference to the attached figures.

DETAILED DESCRIPTION

Figure 1:
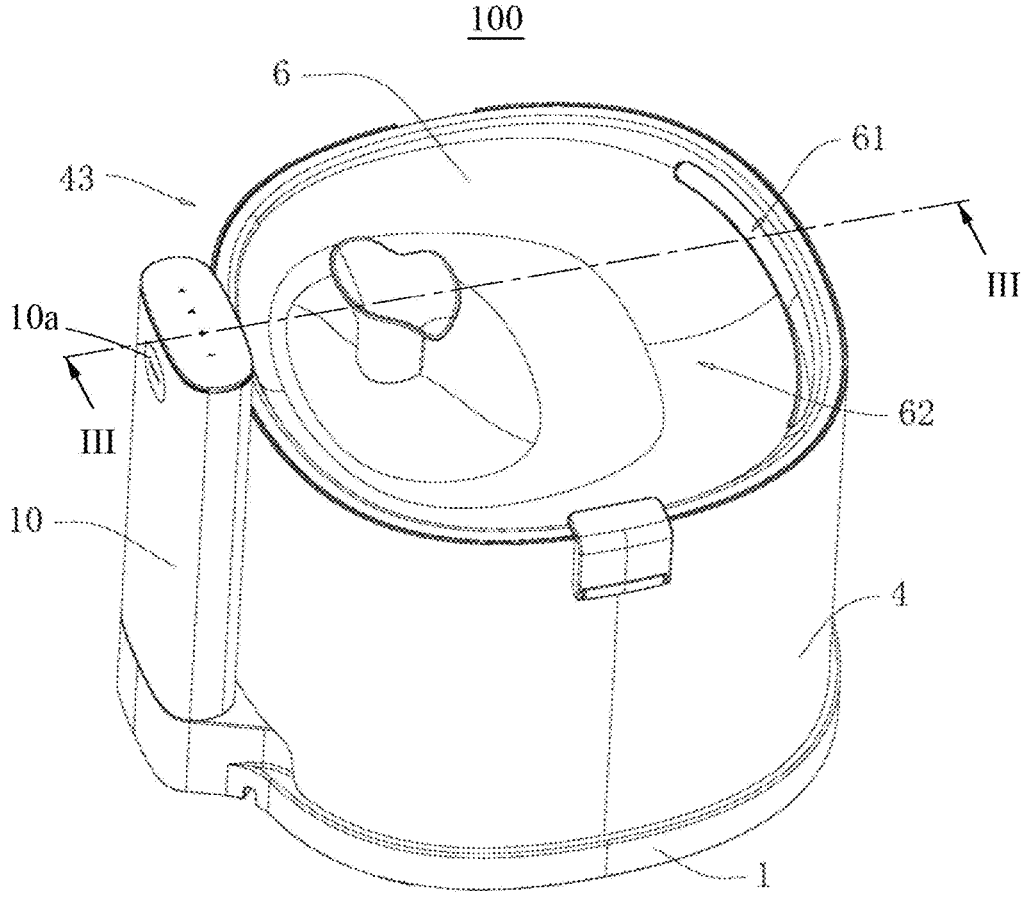
FIG. 1 is a schematic diagram illustrating a water dispenser according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of a water dispenser 100 for pets. Referring to FIGS. 1, 2, 3 and 4, the water dispenser 100 includes a mounting base 1, a turnplate 2, a driving member 3, a water tank 4 and a fan blade 5. The mounting base 1 is usually placed on the level ground and includes an inner surface 110 to define a mounting cavity 11. A battery, a circuit board, and other electronic components required for water dispenser are received in the mounting cavity 11. The turnplate 2 is rotatably received in the mounting cavity 11. A first driving magnet 21 is fixed on the turnplate 2, and the first driving magnet 21 is offset from a rotation axis of the turnplate 2. The driving member 3 is received in the mounting cavity 11 and fixed in the mounting base 1. The driving member 3 is connected to the turnplate 2 to drive the turnplate 2 to rotate in the mounting cavity 11. The first driving magnet 21, the driving member 3, and the turnplate 2 are defined as a driving assembly 2a. In at least one embodiment, the turnplate 2 may be omitted, the first driving magnet 21 may be arranged on the driving member 3, and the driving assembly 2a may be defined by the first driving magnet 21 and the driving member 3.

The mounting base 1 includes a bottom wall 101 for supporting on the ground. The first driving magnet 21 may be fixed on a side of the turnplate 2 facing away from the bottom wall 101. In at least one embodiment, referring to FIGS. 4 and 5, the first driving magnet 21 may be embedded from the side of the turnplate 2 facing away from the bottom wall 101, which is beneficial to reducing a space occupied by the first driving magnet 21 and the turnplate 2.

Figure 2:
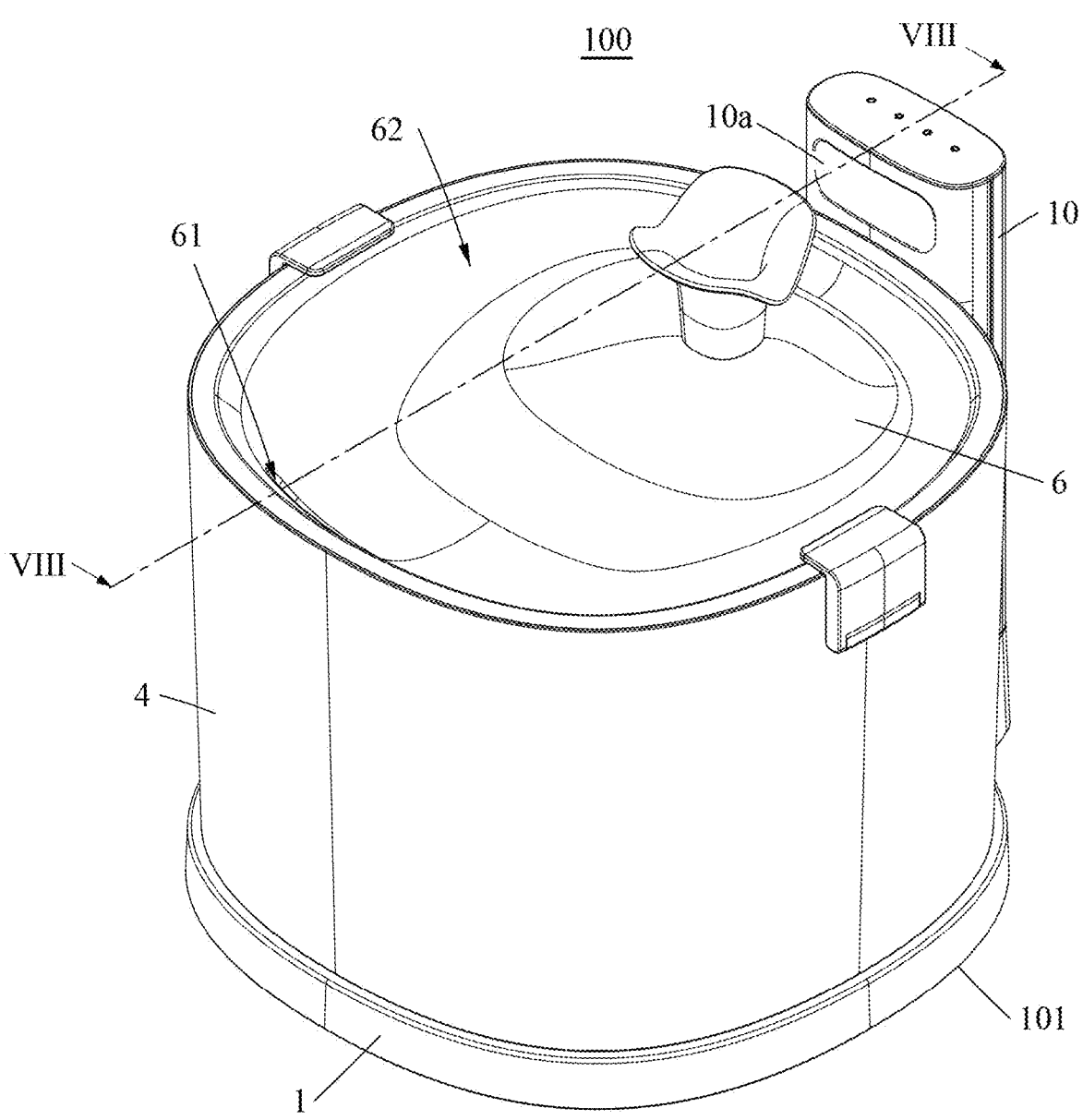
FIG. 2 is a schematic diagram illustrating a water dispenser viewed from another angle according to another embodiment of the present disclosure.
Figure 6:
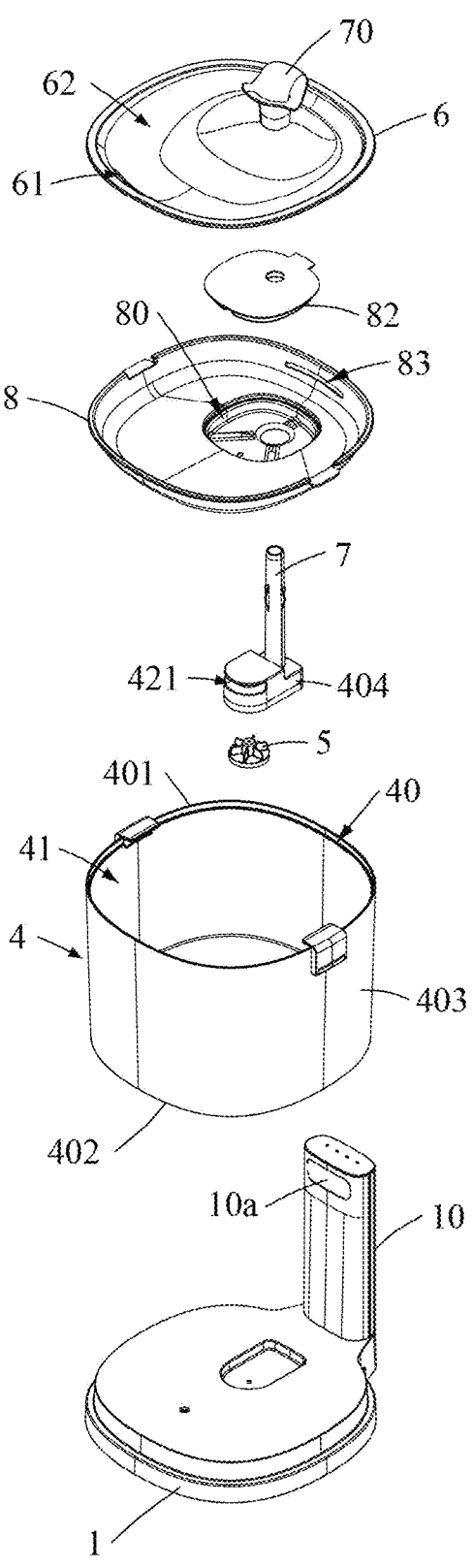
FIG. 6 is an exploded view illustrating a water dispenser according to an embodiment of the present disclosure.
Figure 7:
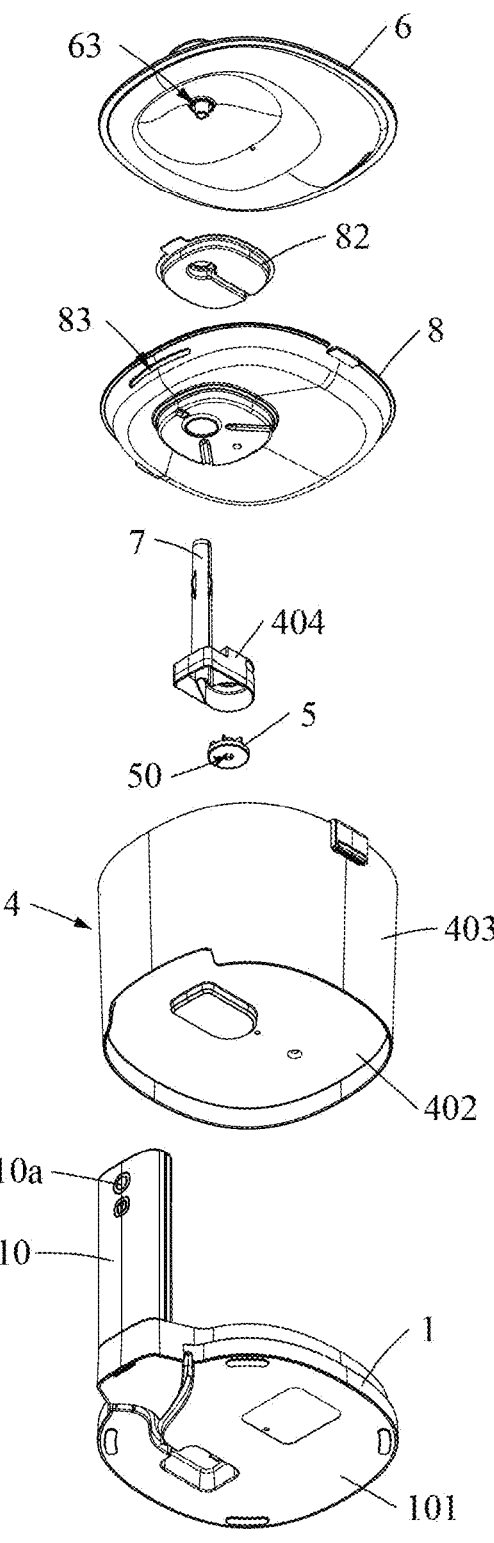
FIG. 7 is an exploded view illustrating the water dispenser of FIG. 6 viewed from another angle.

Referring to FIGS. 2, 6, and 7, the water tank 4 may be in a shape of a box with an opening 40. The water tank 4 may be detachably or fixedly installed on a side of the mounting base 1 facing away from the bottom wall 101. The water tank 4 includes an upper wall 401, a bottom wall 402 away from the upper wall 401 and a side wall 403 connecting the upper wall 401 and the bottom wall 402. The bottom wall 402 is installed on the mounting base 1. The opening 40 is defined by the upper wall 401 of the water tank 4. A water tray 6 is connected to the upper wall 401 of the water tank 4 to cover the opening 40. The upper wall 401, the bottom wall 402, and the side wall 403 together define a storage cavity 41. Referring to FIGS. 3, 4, 7, and 8, a cover element 404 is received in the storage cavity 41 and mounted on the bottom wall 402. The cover element 404 cooperates with the bottom wall 402 to define a pumping chamber 42. The cover element 404 may be defined as a drainage assembly 40a. A water inlet 421 and a water outlet 422 are defined by the cover element 404. The water inlet 421 communicates with the storage cavity 41 and the pumping chamber 42. A water conduit 7 is connected to the water outlet 422, and the water outlet 422 communicates with the water conduit 7 and the pumping chamber 42. The water conduit 7 communicates with the water tray 6. An end of the water conduit 7 away from the cover element 404 may be located on a side of the water tray 6 facing away from the bottom wall 402 and defines a water feeding opening 43, so that the water falls onto the water tray 6 after it leaves the water tray 6 at a predetermined height, thereby further improving the fluidity of the water. The water tray 6 defines a drain outlet 61 communicating with the storage cavity 41. In at least one embodiment, the water tray 6 defines a connecting hole 63 for communicating with the water conduit 7 or passing through the water conduit 7. In at least one embodiment, the drainage assembly 40a may be defined by the cover element 404 and the water conduit 7.

Referring to FIGS. 3, 4, 5, and 8, the fan blade 5 is rotatably received in the pumping chamber 42, and the fan blade 5 is coaxially arranged with the turnplate 2, that is, a rotation axis of the fan blade 5 is coaxial with the rotation axis of the turnplate 2. A second driving magnet 51 is fixed on the fan blade 5, and the second driving magnet 51 is offset from the rotation axis of the fan blade 5. In at least one embodiment, the second driving magnet 51 may be fixed on a side of the fan blade 5 close to the turnplate 2, for example, the second driving magnet 51 may be embedded from the side of the fan blade 5 close to the turnplate 2. Since the second driving magnet 51 and the first driving magnet 21 are attracted to each other, the turnplate 2 in a rotating state can drive the fan blade 5 to rotate, that is, the fan blade 5 can be driven to rotate by magnetic force between the second driving magnet 51 and the first driving magnet 21, thereby realizing a circular flow of water between the water tray 6 and the storage cavity 41. When the first driving magnet 21 is embedded from the side of the turnplate 2 facing away from the bottom wall 101, it is convenient for the first driving magnet 21 to be placed close to the second driving magnet 51, thereby facilitating the first driving magnet 21 to drive the fan blade 5.

Referring to FIGS. 1 to 8, compared with arranging the water pump directly in the water received in the water tank 4, in the above water dispenser 100, the driving member 3 is not directly placed in the water, that is, the driving member 3 is completely separated from the water, and at the same time, the turnplate 2 drives the fan blade 5 to rotate through a cooperation between the second driving magnet 51 and the first driving magnet 21 to achieve water pumping function, so that the water dispenser 100 can realize a separation of water and electricity, thereby preventing pets from getting electric shock when using the water dispenser

100 to drink water. The safety of the water dispenser 100 can be improved, so that the user experience can be improved.

Figure 4:
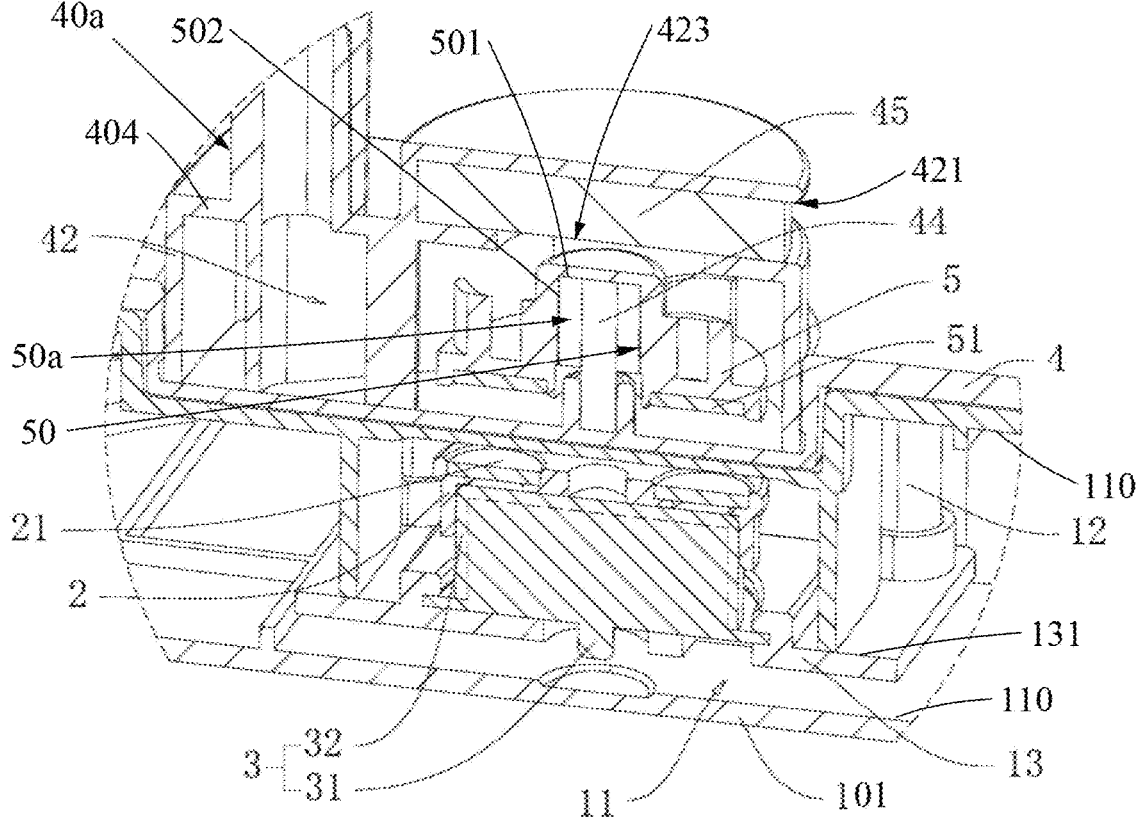
FIG. 4 is a partial enlarged view of the water dispenser of FIG. 3.
Figure 5:
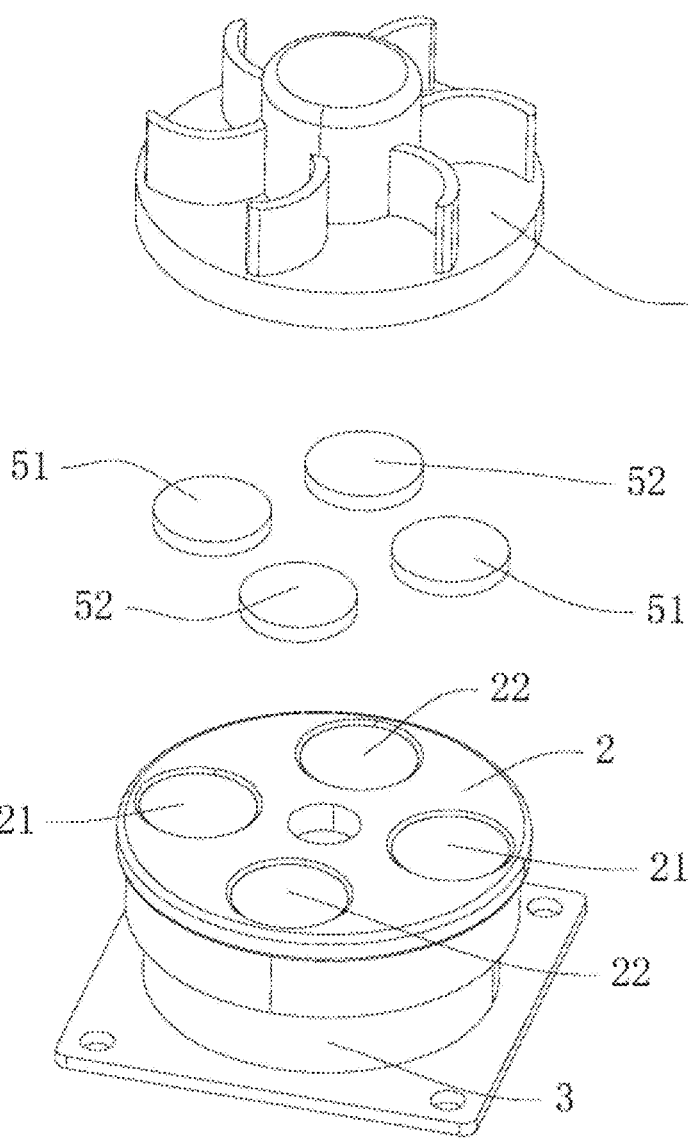
FIG. 5 is an partially exploded view illustrating a water dispenser according to an embodiment of the present disclosure.

Referring to FIGS. 1, 4, and 5, in order to reduce the noise when the water dispenser 100 is operating, in at least one embodiment, the water dispenser 100 may include a plurality of first driving magnets 21 including the first driving magnet 21 and a plurality of second driving magnets 51 including the second driving magnet 51. The plurality of first driving magnets 21 is evenly distributed around the rotation axis of the turnplate 2, and the plurality of second driving magnets 51 is evenly distributed around the rotation axis of the fan blade 5, and at the same time, one of the plurality of first driving magnets 21 is used to attract one of the plurality of second driving magnets 51, so that a counterweight of the turnplate 2 and a counterweight of the fan blade 5 are more even, thereby reducing the vibration or jitter generated by the turnplate 2 and the vibration or jitter generated by the fan blade 5, so as to reduce the noise and improve an uniformity of a transmission force exerted by the turnplate 2 on the fan blade 5.

Figure 3:
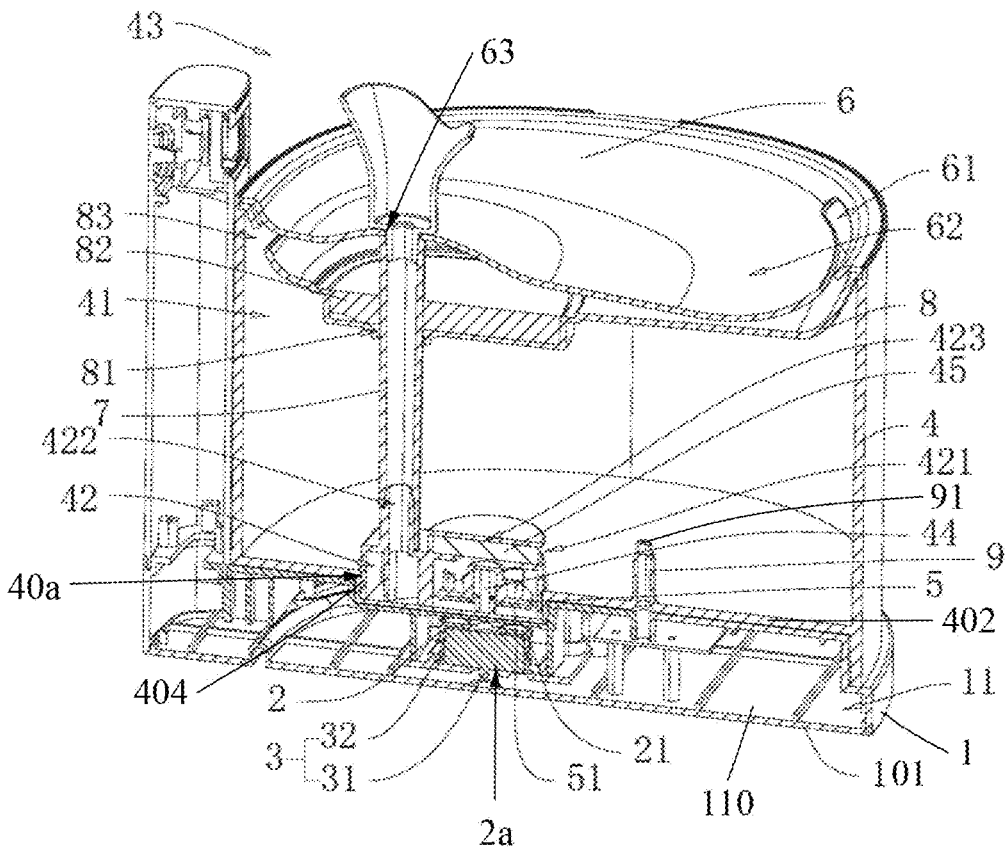
FIG. 3 is a cross-sectional view illustrating the water dispenser viewed from III-III line in FIG. 1.

Referring to FIGS. 3 and 4, in order to reduce the noise when the water dispenser 100 is operating, in at least one embodiment, a connecting rod 12 and an elastic mounting plate 13 may be arranged in the mounting cavity 11. The connecting rod 12 may be in a shape of a cylinder. In at least one embodiment, the water dispenser 100 may include four connecting rods 12 including the connecting rod 12, and the four connecting rods 12 are rectangularly distributed. A first end of each of the four connecting rods 12 is fixed on the inner surface 110 of the mounting base 1, and a second end of each of the four connecting rods 12 away from the first end is fixed on the elastic mounting plate 13. The elastic mounting plate 13 may be in a shape of a thin rectangular parallelepiped, and the elastic mounting plate 13 may be made of a material including but not limited to rubber and/or silicone. The elastic mounting plate 13 includes an upper surface 131 facing away from the bottom wall 101 of the mounting base 1. The driving member 3 is installed on the elastic mounting plate 13. The second end of each of the four connecting rods 12 is fixed on the upper surface 131 of the elastic mounting plate 13. The four connecting rods 12 are respectively provided at four corners of the elastic mounting plate 13 to fix the elastic mounting plate 13 in the mounting cavity 11, and at the same time, the elastic mounting plate 13 and the inner surface 110 of the mounting base 1 are separated from each other. The elasticity of the elastic mounting plate 13 can be used to weaken a vibration transmitted to the mounting base 1 from the driving member 3 when the driving member 3 is operating, and the gap between the elastic mounting plate 13 and the bottom wall 101 can further weaken the vibration transmitted to the mounting base 1 from the driving member 3, thereby significantly reducing the noise generated when the water dispenser 100 is operating.

Referring to FIGS. 1, 3 and 5, in at least one embodiment, the water dispenser 100 may further include a plurality of first auxiliary magnets 22 and a plurality of second auxiliary magnets 52. The plurality of first auxiliary magnets 22 is evenly distributed around the rotation axis of the turnplate 2, and each of the plurality of first auxiliary magnets 22 is located between two adjacent first driving magnets 21 of the plurality of first driving magnets 21. Each of the plurality of first auxiliary magnets 22 repels one of the plurality of second driving magnets 51. The plurality of second auxiliary magnets 52 is evenly distributed around the rotation axis of the fan blade 5, and each of the plurality of second auxiliary magnets 52 is located between two adjacent second driving magnets 51 of the plurality of second driving magnets 51. Each of the plurality of second auxiliary magnets 52 attracts one of the plurality of first auxiliary magnets 22 and repels one of the plurality of first driving magnets 21. During the rotation of the turnplate 2, a lateral pulling force will be formed between each of the plurality of first driving magnets 21 and one of the plurality of second driving magnets 51, a lateral pulling force will be formed between each of the plurality of first auxiliary magnets 22 and one of the plurality of second auxiliary magnets 52, a lateral thrust will be formed between each of the plurality of first driving magnets 21 and one of the plurality of second auxiliary magnets 52, and a lateral thrust will be formed between each of the plurality of first auxiliary magnets 22 and one of the plurality of second driving magnets 51, so that the rotation speed of the turnplate 2 can be increased to improve the water circulation flow efficiency while maintaining a working stability of the water dispenser 100, and the fan blade 5 is more difficult to separate from the turnplate 2 when the turnplate 2 rotates faster.

Referring to FIGS. 1 and 3, in at least one embodiment, the driving member 3 may be an external-rotor motor, so that an installation structure of the fan blade 5 and the turnplate 2 is simple, which is beneficial to reducing a space occupied by the installation structure so that more water can be loaded without increasing the volume of the water dispenser 100. The driving member 3 may include a fixed shaft 31 and a driving shell 32. The fixed shaft 31 is fixed on the inner surface 110 of the mounting base 1. In at least one embodiment, the fixed shaft 31 may be fixed on the elastic mounting plate 13. The driving shell 32 is used to install the turnplate 2. In at least one embodiment, the turnplate 2 may be sleeved on the driving shell 32, that is, an end of the driving shell 32 may be embedded in the turnplate 2. The turnplate 2 and the driving shell 32 may be fixed to each other through interference fit, or the turnplate 2 and the driving shell 32 may be fixed by glue, so that an installation structure of the turnplate 2 and the driving member 3 is simple. In at least one embodiment, the turnplate 2 may also be installed on the driving shell 32 in other ways when the driving member 3 is an external-rotor motor. In at least one embodiment, the driving member 3 may be other types of power components, such as an internal-rotor motor, at this time, the turnplate 2 will be installed on an output shaft of the driving member 3. When the driving member 3 is an external-rotor motor, the manufacturing cost of the water dispenser 100 may be reduced.

Referring to FIGS. 1, 3, 4, and 7, a mounting column 44 may be received in the pumping chamber 42, and a first end of the mounting column 44 may be fixed on the bottom wall 402. The fan blade 5 is rotatably sleeved on a second end of the mounting column 44 facing away from the first end of the mounting column 44, that is, the second end of the mounting column 44 is embedded in the fan blade 5. In at least one embodiment, a mounting hole 50 is recessed inward from a surface of the fan blade 5 facing the bottom wall 402, and the mounting hole 50 is defined by a top inner surface 501 and a side inner surface 502 of the fan blade 5. The second end of the mounting column 44 is received in the mounting hole 50 and is in contact with the top inner surface 501 of the fan blade 5 to support the fan blade 5, and the second end of the mounting column 44 is separated from the side inner surface 502 of the fan blade 5 by a space 50*a*, so that the fan blade 5 can be rotatably installed in the pumping chamber 42, a friction between the fan blade 5 and the mounting column 44 can be reduced, and a noise generated by the rotation of the fan blade 5 can be reduced.

Referring to FIGS. 1, 2, and 7, in order to maintain the amount of water in the water tray 6, an upper surface of the water tray 6 may be recessed toward the bottom wall 402 to form a storage area 62, the storage area 62 is located gravitationally lower than the drain outlet 61 and gravitationally lower than the connecting hole 63 of the water tray 6, so that water can be accumulated in the storage area 62 to meet the needs of pets, especially when the water dispenser 100 is powered off for a short time.

Referring to FIGS. 1, 3, 6, 7, and 8, in order to keep the water in the water tray 6 clean, a water filter tray 8 may be arranged away from the bottom wall 402 of the water tank 4. In at least one embodiment, the water filter tray 8 may be mounted on the upper wall 401. The water filter tray 8 is located between the water tray 6 and the bottom wall 402 of the water tank 4. The drain outlet 61 corresponds to the water filter tray 8. The water conduit 7 penetrates a through hole of the water filter tray 8, and a drain gap 81 is located between the water conduit 7 and an internal surface of the water filter tray 8 defining the through hole to communicate with the storage cavity 41. In at least one embodiment, the water filter tray 8 may include a recess 80 and the water conduit 7 penetrates the recess 80. A first filter element 82 may be received in the recess 80. The first filter element 82 is located between the water filter tray 8 and the water tray 6, which can prevent the first filter element 82 from being bitten and damaged by pets, thereby improving the service life of the water dispenser 100. The first filter element 82 may be made of filter cotton. The water conduit 7 penetrates the first filter element 82, and the first filter element 82 covers the drain gap 81 but does not block the drain gap 81. Therefore, impurities in the water can be filtered out through the first filter element 82 before the water flows back to the storage cavity 41 from the water tray 6 to keep the water in the storage cavity 41 clean and keep the water circulating to the water tray 6 clean. In addition, when the water falls from the water filter tray 8 to the storage cavity 41, the water will flow downward along an outside surface of the water conduit 7, thereby reducing the noise of water falling from high places.

In at least one embodiment, the drain gap 81 may be provided at other positions of the water filter tray 8, and a sealing structure may be arranged to seal a gap between the water conduit 7 and the internal surface of the water filter tray 8 defining the through hole. The first filter element 82 made of a material that does not significantly reduce water flow may be arranged in the drain gap 81. In at least one embodiment, the first filter element 82 only needs to be arranged in a position of the water filter tray 8 between the drain outlet 61 and the drain gap 81, so that the water passes through the first filter element 82 from the drain outlet 61 before moving to the drain gap 81.

Referring to FIGS. 3, 6, 7, and 8, if the first filter element 82 is used for a long time without being cleaned or replaced in time, the first filter element 82 may be blocked. Therefore, in order to prevent the water between the water filter tray 8 and the water tray 6 from flowing backward from the drain outlet 61 due to a blockage of the first filter element 82, an overflow opening 83 may be defined by the water filter tray 8 to communicate with the storage cavity 41. The overflow opening 83 is located between the drain outlet 61 and the drain gap 81, that is, the overflow opening 83 is located on a side of the drain outlet 61 close to the bottom wall 402 and on a side of the drain gap 81 facing away from the bottom wall 402. When the amount of water in the water filter tray 8 exceeds the overflow opening 83, the water will flow from the overflow opening 83 into the storage cavity 41.

Referring to FIGS. 3 and 4, since the water flowing out from the overflow opening 83 has not been filtered, in order to keep the water for pets clean, a second filter element 45 may be arranged in the pumping chamber 42. The second filter element 45 may be made of filter cotton. The pumping chamber 42 includes a filter receiving portion 423 between the fan blade 5 and the water inlet 421. The second filter element 45 is received in the filter receiving portion 423. The water entering from the water inlet 421 will pass through the fan blade 5 after passing through the second filter element 45, thereby filtering the water again and preventing the fan blade 5 from being stuck by hair and other impurities. When adding water into the storage cavity 41, hair in the air may also enter the storage cavity 41, so the second filter element 45 can also filter out impurities generated in this way.

In at least one embodiment, the filter receiving portion 423 may be located above the fan blade 5.

Figure 9:
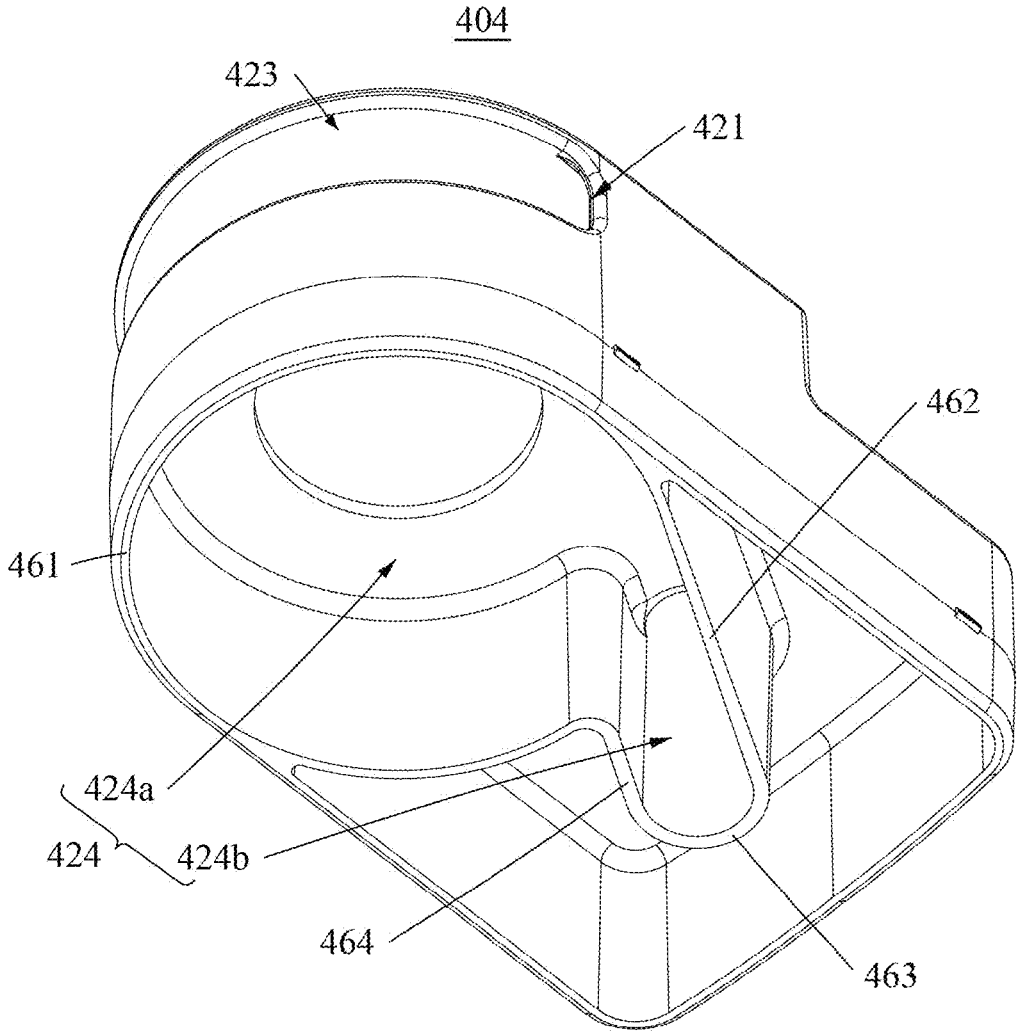
FIG. 9 is a schematic diagram illustrating a cover element according to an embodiment of the present disclosure.
Figure 10:
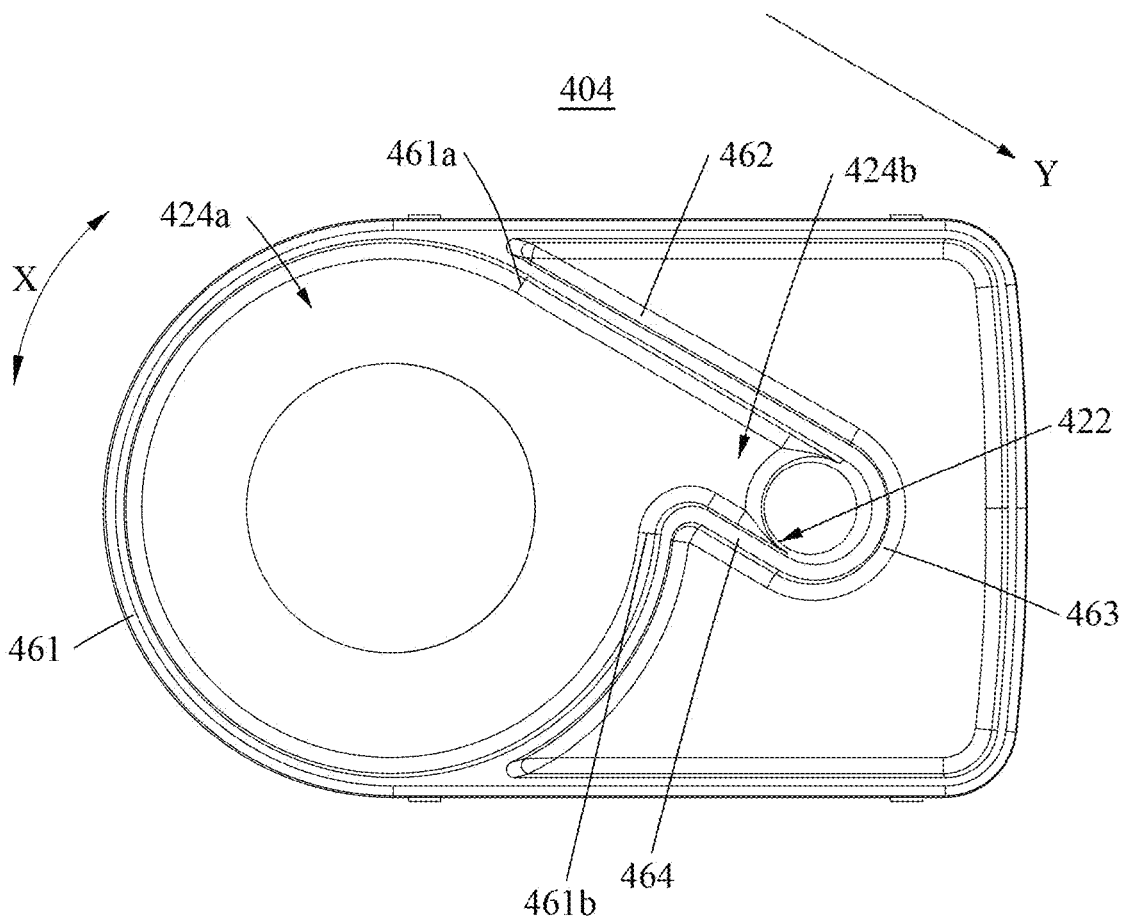
FIG. 10 a schematic diagram illustrating the cover element of FIG. 9 viewed from another angle.

Referring to FIGS. 4, 9, and 10, the pumping chamber 42 further includes a pumping portion 424 for receiving the fan blade 5. The pumping portion 424 is located under the filter receiving portion 423, and communicates with the filter receiving portion 423 through a communicating hole (not labeled). The pumping portion 424 may include a first part 424a and a second part 424b communicating with the first part 424a, and the pumping portion 424 may in a shape of "6". The cover element 404 may include an arc-shaped wall 461 used to define the first part 424a, and the cover element 404 may further include a first extension wall 462, a connecting wall 463, and a second extension wall 464 connected in sequence to be used to define the second part 424b. The arc-shaped wall 461 includes a first end 461a and a second end spaced 461b apart along an arc extending direction X of the arc-shaped wall 461. The first extension wall 462 may extend from the first end of the arc-shaped wall 461 along a tangential direction Y of the arc-shaped wall 461. The second extension wall 464 may extend from the second end of the arc-shaped wall 461 in a direction away from the arc-shaped wall 461, and the second extension wall 464 may be parallel to the first extension wall 462. The connecting wall 463 connects an end of the first extension wall 462 away from the arc-shaped wall 461 and an end of the second extension wall 464 away from the arc-shaped wall 461. The fan blade 5 is received in the first part 424a, and the communicating hole corresponds to the first part 424a, and the water outlet 422 corresponds to the second part 424b.

Referring to FIGS. 1 and 3, the water dispenser 100 may further include a water level sensor 91 received in the water tank 4 to judge whether the water level in the water tank 4 is gravitationally lower than a minimum working water level, so that people can be reminded in time to replenish the water tank 4. The driving member 3 may be turned off when the water level in the water tank 4 is gravitationally lower than the minimum working water level, and the water dispenser 100 will send out a warning signal to indicate a water level status in the water tank 4. The water level sensor 91 may be a capacitive sensor. In at least one embodiment, a protrusion 9 received in the water tank 4 may protrude from the bottom wall 402. The protrusion 9 and the bottom wall 402 may be integrally formed. The water level sensor 91 may be mounted on an end of the protrusion 9 away from the bottom wall 402. The water level sensor 91 improves the intelligence and the safety of the water dispenser 100. In at least one embodiment, referring to FIGS. 1 and 2, the water dispenser 100 may further include a sensor column 10 fixed on the mounting base 1 and located outside the water tank 4. The sensor column 10 includes an infrared sensor 10a to determine whether the pet is close to the water dispenser 100, and the water dispenser 100 automatically works when the pet approaches the water dispenser, thereby further enhancing the intelligence of the water dispenser 100. In at least one embodiment, the infrared sensor 10a may be replaced with other types of sensors to implement this function.

Figure 8:
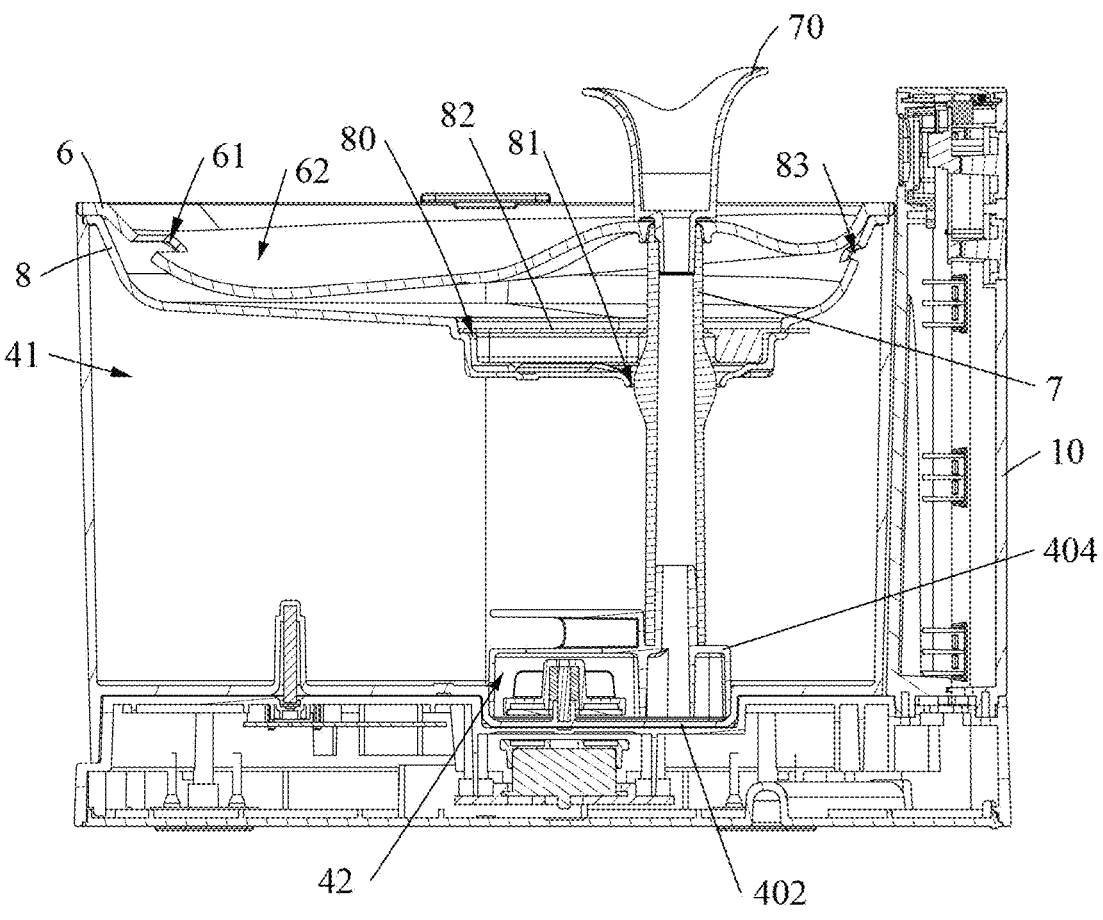
FIG. 8 is a cross-sectional view illustrating the water dispenser viewed from VIII-VIII line in FIG. 2.

In at least one embodiment, referring to FIGS. 6 and 8, the end of the water conduit 7 away from the cover element 404 may be connected with a nozzle 70, so that the water falls onto the water tray 6 after it leaves the water tray 6 at a predetermined height, thereby further improving the fluidity of the water.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A water dispenser for pets, comprising:
   a water tank for receiving a liquid;
   a drainage assembly arranged in the water tank;
   a fan blade rotatably received in the drainage assembly for driving the liquid in the water tank to flow out through the drainage assembly; and
   a driving assembly arranged outside the water tank and configured for driving the fan blade to rotate through magnetic force,
   wherein the water dispenser further comprises a mounting column fixed in the drainage assembly, the fan blade comprises a top inner surface and a side inner surface, the top inner surface and the side inner surface defines a mounting hole, the mounting column having a first end and a second end, wherein the first end of the mounting column is embedded in the mounting hole and is in contact with the top inner surface of the fan blade, and the first end of the mounting column is separated by a continuous circumferential space from the side inner surface of the fan blade.

2. The water dispenser of claim 1, wherein the driving assembly comprises a first driving magnet and a driving member for driving the first driving magnet to rotate, the water dispenser further comprises a second driving magnet fixed on the fan blade, the fan blade correspondingly positioned relative to the driving member, when the driving member drives the first driving magnet to rotate, the first driving magnet attracts the second driving magnet to drive the fan blade to rotate.

3. The water dispenser of claim 2, wherein the driving assembly further comprises a turnplate connected to the driving member, the first driving magnet is fixed on the turnplate and offset from a rotation axis of the turnplate, the driving member is configured for driving the turnplate to rotate.

4. The water dispenser of claim 2, wherein the water dispenser further comprises a plurality of first driving magnets comprising the first driving magnet and a plurality of second driving magnets comprising the second driving magnet, the plurality of first driving magnets is evenly distributed around a rotation axis of the fan blade, the plurality of second driving magnets is evenly distributed around the rotation axis of the fan blade, each of the plurality of first driving magnets is positioned to attract a corresponding one of the plurality of second driving magnets.

5. The water dispenser of claim 4, wherein the water dispenser further comprises a plurality of first auxiliary magnets and a plurality of second auxiliary magnets, the plurality of first auxiliary magnets is evenly distributed around the rotation axis of the fan blade, each of the plurality of first auxiliary magnets is located between two adjacent first driving magnets of the plurality of first driving magnets, each of the plurality of first auxiliary magnets repels each of the plurality of second driving magnets, the plurality of second auxiliary magnets is evenly distributed around the rotation axis of the fan blade, each of the plurality of second auxiliary magnets is located between two adjacent second driving magnets of the plurality of second driving magnets, each of the plurality of second auxiliary magnets attracts a corresponding one of the plurality of first auxiliary magnets and repels a corresponding one of the plurality of first driving magnets.

6. The water dispenser of claim 2, wherein the water dispenser further comprises a mounting base defining a mounting cavity, the driving assembly is received in the mounting cavity, the mounting base is detachably connected to the water tank.

7. The water dispenser of claim 6, wherein the mounting base comprises an inner surface, the mounting cavity is defined by the inner surface, the water dispenser further comprises a connecting rod and an elastic mounting plate arranged in the mounting cavity, one end of the connecting rod is connected to the inner surface of the mounting base, another end of the connecting rod is connected to the elastic mounting plate, the elastic mounting plate is separated from the inner surface of the mounting base, the driving member is arranged on the elastic mounting plate.

8. The water dispenser of claim 7, wherein the driving member is an external-rotor motor and comprises a fixed shaft and a driving shell, the fixed shaft is fixed on the elastic mounting plate, the first driving magnet is arranged on the driving shell.

9. The water dispenser of claim 1, wherein the water tank comprises an upper wall, a bottom wall away from the upper wall, and a side wall connecting the upper wall and the bottom wall, the upper wall, the bottom wall, and the side wall together surround to define a storage cavity, an opening is defined by the upper wall, the drainage assembly comprises a cover element received in the storage cavity and mounted on the bottom wall, the cover element cooperates with the bottom wall to define a pumping chamber, a water inlet and a water outlet are defined by the cover element, the water inlet communicates with the storage cavity and the pumping chamber, the fan blade is rotatably received in the pumping chamber.

10. The water dispenser of claim 9, wherein the water dispenser further comprises a water tray connected to the upper wall of the water tank and covering the opening, the water tray defines a drain outlet communicating with the storage cavity, the drainage assembly further comprises a water conduit connected to the water outlet, the water outlet communicates with the water conduit and the pumping chamber, the water conduit communicates with the water tray.

11. The water dispenser of claim 10, wherein an end of the water conduit away from the cover element is located on a side of the water tray facing away from the bottom wall.

12. The water dispenser of claim 10, wherein the water tray comprises a connecting hole for passing through the water conduit or communicating with the water conduit, an upper surface of the water tray facing away from the bottom wall is recessed toward the bottom wall to form a storage area, the storage area is located gravitationally lower than the drain outlet and gravitationally lower than the connecting hole.

13. The water dispenser of claim 11, wherein the water dispenser further comprises a water filter tray arranged between the water tray and the bottom wall of the water tank, the drain outlet corresponds to the water filter tray, the water filter tray comprises an internal surface to define a through hole, the water conduit penetrates the through hole of the water filter tray, and a drain gap is located between the water conduit and the internal surface of the water filter tray to communicate with the storage cavity, the water dispenser further comprises a first filter element in the water filter tray, the first filter element covers the drain gap.

14. The water dispenser of claim 13, wherein the water filter tray further comprises a recess, the water conduit penetrates the recess, and the first filter element is received in the recess.

15. The water dispenser of claim 13, wherein the water filter tray defines an overflow opening, the overflow opening communicates with the storage cavity, the overflow opening is located between the drain outlet and the drain gap.

16. The water dispenser of claim 14, wherein the water dispenser further comprises a second filter element corresponding to the water inlet of the pumping chamber.

17. The water dispenser of claim 16, wherein the pumping chamber comprises a filter receiving portion receiving the second filter element and a pumping portion receiving the fan blade, the filter receiving portion communicates with the pumping portion and the water inlet.

18. The water dispenser of claim 17, wherein the pumping portion comprises a first part and a second part communicating with the first part, the cover element comprises an arc-shaped wall, the first part is defined by the arc-shaped wall, the arc-shaped wall has an arc extending direction, the arc-shaped wall comprises a first end and a second end along the arc extending direction, the cover element further comprises a first extension wall, a connecting wall, and a second extension wall connected in sequence for defining the second part, the first extension wall extends from the first end of the arc-shaped wall along a tangential direction of the arc-shaped wall, the second extension wall extends from the second end of the arc-shaped wall in a direction away from the arc-shaped wall, the fan blade is received in the first part, the second part communicates with the filter receiving portion through the first part, the water outlet is correspondingly positioned relative to the second part.

19. The water dispenser of claim 1, wherein the water dispenser further comprises a water level sensor received in the water tank to judge whether the water level in the water tank is lower than a minimum working water level, and/or the water dispenser further comprises a sensor located outside the water tank and mounted on the mounting base for determining whether the pet is within a predetermined range from the water dispenser.

\* \* \* \* \*